US012748862B2

(12) United States Patent
Chen et al.

(10) Patent No.: US 12,748,862 B2
(45) Date of Patent: Sep. 29, 2026

(54) FUNCTION-BASED SERVICE FRAMEWORK BASED ON TRUSTED EXECUTION ENVIRONMENT

(71) Applicant: Dell Products L.P., Round Rock, TX (US)

(72) Inventors: Tianxiang Chen, Shanghai (CN); Jinpeng Liu, Shanghai (CN); Zhen Jia, Shanghai (CN); Kenneth Durazzo, Morgan Hill, CA (US)

(73) Assignee: Dell Products L.P., Round Rock, TX (US)

( * ) Notice: Subject to any disclaimer, the term of this patent is extended or adjusted under 35 U.S.C. 154(b) by 448 days.

(21) Appl. No.: 17/901,953

(22) Filed: Sep. 2, 2022

(65) Prior Publication Data

US 2024/0078321 A1 Mar. 7, 2024

(51) Int. Cl.

*G06F 21/60* (2013.01)
*G06F 21/53* (2013.01)
*H04L 9/08* (2006.01)

(52) U.S. Cl.

CPC ............ *G06F 21/602* (2013.01); *G06F 21/53* (2013.01); *H04L 9/0822* (2013.01)

(58) Field of Classification Search

CPC ....... G06F 21/602; G06F 21/53; H04L 9/0822
See application file for complete search history.

(56) References Cited

U.S. PATENT DOCUMENTS

| | | | | |
|---|---|---|---|---|
| 11,314,882 | B2 * | 4/2022 | Porter | G06F 21/64 |
| 12,056,232 | B2 * | 8/2024 | Liu | G06F 9/45558 |
| 2010/0185843 | A1 * | 7/2010 | Olarig | G06F 21/6218<br>713/173 |
| 2021/0389854 | A1 * | 12/2021 | Rose | G06F 3/0482 |
| 2022/0103349 | A1 * | 3/2022 | Tsirkin | G06F 21/53 |
| 2022/0182365 | A1 * | 6/2022 | Bowman | H04L 9/3234 |

OTHER PUBLICATIONS

Alder et al. (S-FaaS: Trustworthy and Accountable Function-as-a-Service using Intel SGX, arXiv:1810.06080v1 Oct. 14, 2018, 16 pages) (Year: 2018).*

(Continued)

*Primary Examiner* — Oleg Korsak
(74) *Attorney, Agent, or Firm* — Ryan, Mason & Lewis, LLP

(57) ABSTRACT

Techniques for integrating a trusted execution platform with a function-based service framework are disclosed. For example, a method comprises reading configuration information identifying at least one data providing party and at least one function providing party, and generating, based at least in part on the configuration information, an enclave comprising a circuit configured to execute a function. The method further comprises receiving in the enclave and via at least a first secure communication channel, the function from the at least one function providing party, and receiving in the enclave and via at least a second secure communication channel, data from the at least one data providing party. The function and the data are sent to the circuit, wherein the circuit executes the function to compute at least one output based at least in part on the data.

20 Claims, 5 Drawing Sheets

100

(56) References Cited

OTHER PUBLICATIONS

T. Liu, Z. Huang, J. Li, J. Niu, G. Chen and Y. Zhang, "SoK: Opportunities for Accelerating Multi-Party Computation via Trusted Hardware," 2024 International Symposium on Secure and Private Execution Environment Design (SEED), Orlando, FL, USA, 2024, pp. 143-154 (Year: 2024).*

Felsen et al (Secure and Private Function Evaluation with Intel SGX, CCSW'19, Nov. 11, 2019, 17 pages) (Year: 2019).*

Github, "Open Enclave SDK," https://openenclave.io/sdk/, Accessed Apr. 21, 2022, 3 pages.

Github, "Asylo," https://github.com/google/asylo, Accessed Apr. 21, 2022, 8 pages.

Wikipedia, "Call Stack," https://en.wikipedia.org/wiki/Call_stack, Mar. 22, 2022, 8 pages.

Wikipedia, "Homomorphic Encryption," https://en.wikipedia.org/wiki/Homomorphic_encryption, May 2, 2022, 12 pages.

Wikipedia, "Trusted Computing Base," https://en.wikipedia.org/wiki/Trusted_computing_base, Jan. 13, 2021, 4 pages.

P. Mohassel et al., "How to Hide Circuits in MPC: An Efficient Framework for Private Function Evaluation," Annual International Conference on the Theory and Applications of Cryptographic Techniques, May 2013, 34 pages.

M. Y. Alhassan et al., "Efficient and Scalable Universal Circuits," Journal of Cryptology, vol. 33, Apr. 8, 2020, pp. 1216-1271.

U.S. Appl. No. 17/459,705 filed in the name of Jinpeng Liu et al., filed Aug. 27, 2021, and entitled "Function-Based Service Framework with Trusted Execution Platform."

U.S. Appl. No. 17/829,485 filed in the name of Jinpeng Liu et al., filed Jun. 1, 2022, and entitled "Multi-Party Computation Framework Based on Trusted Execution Environment."

* cited by examiner

300

310

FUNCTION-BASED SERVICE FRAMEWORK BASED ON TRUSTED EXECUTION ENVIRONMENT

FIELD

The field relates generally to information processing systems, and more particularly to data protection in such information processing systems.

BACKGROUND

Functions such as, for example, those performed in a Function-as-a-Service ("FaaS") scenario, may require protection from access by unauthorized parties. An example of such a function may be a high-performance algorithm that is protected under one or more proprietary rights of an entity. In addition, sensitive data such as, for example, financial information, medical information and other private information that may be used in multiple computing applications, require safeguards that prevent the data from unwanted exposure.

Current attempts to protect data or functions such as, for example, homomorphic encryption, secret sharing circuits and garbled circuits, suffer from poor performance and/or require excessive computational power. For example, the large volume and depth of homomorphic encryption circuits uses significant amounts of computing resources. In addition, secret sharing and garbled circuits require numerous small-sized data packet exchanges across a network, resulting in poor performance. Due to their limitations, conventional techniques are not practical for use in wide area network (WAN) based computing environments, such as cloud or edge computing environments.

SUMMARY

Illustrative embodiments provide techniques for integrating a trusted execution platform with a function-based service framework.

For example, a method comprises reading configuration information identifying at least one data providing party and at least one function providing party, and generating, based at least in part on the configuration information, an enclave comprising a circuit configured to execute a function. The method further comprises receiving in the enclave and via at least a first secure communication channel, the function from the at least one function providing party, and receiving in the enclave and via at least a second secure communication channel, data from the at least one data providing party. The function and the data are sent to the circuit, wherein the circuit executes the function to compute at least one output based at least in part on the data.

These and other features and advantages of embodiments described herein will become more apparent from the accompanying drawings and the following detailed description.

DETAILED DESCRIPTION

Figure 1:
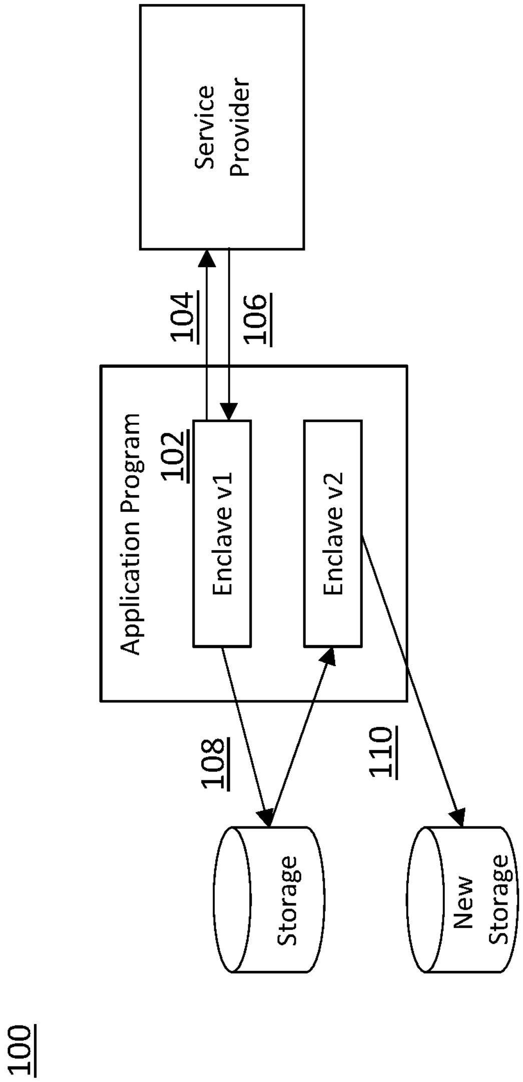
FIG. 1 illustrates an exemplary workflow in an application execution environment with which one or more illustrative embodiments can be implemented.

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." Other definitions, either explicit or implicit, may be included below.

Multi-party computation (MPC) (also referred to as "secure multi-party computation (SMPC)) uses cryptography and a protocol to simulate a trusted third party to execute a pre-defined computation based on inputs from parties, while keeping the input(s) from another party private from a given party. For example, assuming two parties A and B own the inputs x and y, respectively, and want to compute if x>y. An MPC input protocol will compute the Boolean expression x>y and return the resulting output value to A and B without revealing y to A and x to B. With the advent of cloud and outsource computing, MPC may be applied to various application program execution scenarios including, but not limited to, electronic voting, private DNA matching, privacy-preserving network monitoring, secure machine learning and federated learning.

With conventional approaches, MPC protocols can be implemented using, for example, garbled circuits, linear secret sharing, homomorphic encryption and homomorphic secret sharing. Current MPC techniques are not practical for use in WAN based computing environments since they use significant amounts of computing resources, and require numerous small-sized data packet exchanges across a network, resulting in poor performance.

Private Function Evaluation (PFE) utilizes the techniques of MPC to provide for secure evaluation of private functions. For example, as noted herein, in some applications, in addition to party data, the function itself is proprietary and should be kept private. In accordance with illustrative embodiments of the present invention, PFE is utilized to ensure that only one party (e.g., P1) knows a function $f(x)$, and at least one other party (e.g., P2) provides an input x to the private function $f(x)$.

In some embodiments, PFE is utilized to evaluate private data of multiple parties using a private function owned by another party. In an operational example, a participant $S_0$ provides a private function $f$, while other participants $S_1$, $S_2, \ldots, S_m$ each have their own private input $x_i (1 \le i \le m)$. These parties would like to find $f(x_1, x_2, \ldots, x_m)$, while retaining the confidentiality of their respective inputs and of $S_0$'s function.

The embodiments use a universal circuit to transform an MPC protocol into one for PFE. In illustrative embodiments, the universal circuit (UC) comprises a circuit that can be programmed to simulate any Boolean function $f(x)$ up to a given size. For example, in programming the UC to compute the function $f(x)$, in addition to an input x, a UC takes as input program or control bits $p_c$ that encode the circuit to produce an output $UC(x, p_c)=f(x)$. The UC carries out the computations specified by the instructions of a given function provided via the respective control bits.

Trusted execution platforms can be used by applications to protect user code and data. One example of a trusted execution platform is the Software Guard Extension (SGX) Trusted Execution Environment (TEE) hardware platform available from Intel Corporation, which can be used by applications to populate protected user code and data inside trusted environments. Once activated, the trusted hardware platform protects enclave code and data from outside access and modification. Other examples of TEE implementations include, for example, AMD SEV (Secure Encrypted Virtualization) available from Advanced Micro Devices, Inc. (AMD), and ARM Trustzone available from Arm Ltd.

TEEs provide enclave computing environments to protect code and data from access and modification by unauthorized parties. TEEs further provide attestation, provisioning and sealing services to assure customers that their computing is executed in a trusted platform and their software has not been tampered with, nor has any sensitive information been leaked.

To address the drawbacks of current techniques, illustrative embodiments provide technical solutions that integrate a TEE-based solution into a function-based service framework (e.g., an FaaS framework). Although some embodiments are described in connection with an SGX TEE platform, it is to be appreciated that illustrative embodiments are not limited to implementation with the SGX TEE platform but rather are more generally applicable to other trusted execution platforms and cloud computing paradigms.

The TEE platform has hardware-assisted functionality to provide a trusted execution environment used by applications to populate protected user code and data inside "enclaves" or trusted execution areas. Once activated, the trusted hardware platform protects enclave code and data from outside access and modification. More particularly, an enclave is used to protect code and/or data from access and modification by other parties, for example, the operating system/hypervisor itself or other applications.

Furthermore, the TEE platform utilizes an attestation service that authenticates software provided by the customer to be loaded into the enclave. The attestation service attempts to ensure that the lower layer hardware platform can be trusted, for example, that the central processing unit (CPU) is a genuine product manufactured by a given vendor and that the firmware and microcode is secure without being tampered with by a malicious third-party. Further, the attestation service attempts to ensure application software (code/data) can be trusted, i.e., that code/data of the software has not been tampered with or modified by other malicious parties. Still further, the attestation service attempts to ensure that the software installation process can be trusted, i.e., the software is installed onto the platform exactly as defined without being changed or tampered with by other malicious parties. When these three aspects can be trusted, the customer will be assured that their applications are secure and cannot be exploited.

Still further, the TEE platform utilizes a provisioning service to provide confidentiality to the software by provisioning secrets and sensitive data to the enclave during runtime. After the software is attested (authenticated) by the customer (or other party), the customer can be assured that everything about the application, hardware and software, is secured, and they can then provision their secrets and sensitive data to the application running inside the enclave. Other services such as sealing, migration, and revocation construct a closed loop to consolidate the security of the application running inside the enclave.

FIG. 1 illustrates an exemplary enclave-based TEE platform workflow 100. As shown, in step 102, the TEE platform installs an enclave (enclave v1) and measures the code/data contents and the installation process. In step 104, enclave v1 is remote attested by the data owner service provider and, in step 106, the data owner service provider provisions data to the attested enclave (enclave v1). In step 108, the enclave seals (stores) the data for future usage. The data is encrypted with a key unique to the TEE platform and enclave. After a security upgrade, a new enclave (enclave v2) reads the encrypted data back and seals (stores) the data with a new key in step 110. It is evident from FIG. 1 that, because the software (code and data) is loaded into the enclave in the enclave initialization process, the enclave can only provide authenticity of the software, but not confidentiality. To achieve confidentiality, the data must be provisioned during runtime (step 106) after attestation (step 104) by the customer via a secure channel established with the keys created during the attestation process (not expressly shown in FIG. 1). Further note that the data cannot be built into the enclave software statically, but are provided by the service provider during runtime dynamically. Existing enclave-based TEE software development kits (SDKs) (e.g., Open Enclave SDK available from Microsoft Corporation and Asylo available from Google LLC) encourage the customers to develop their secure applications in their confidential computing environments in Azure or Google Cloud. However, existing enclave-based TEE SDKs are application programming interface (API) oriented and not configured for an MPC framework. As a result, it is difficult for users to develop MPC applications using the existing enclave-based TEE SDKs.

Figure 2:
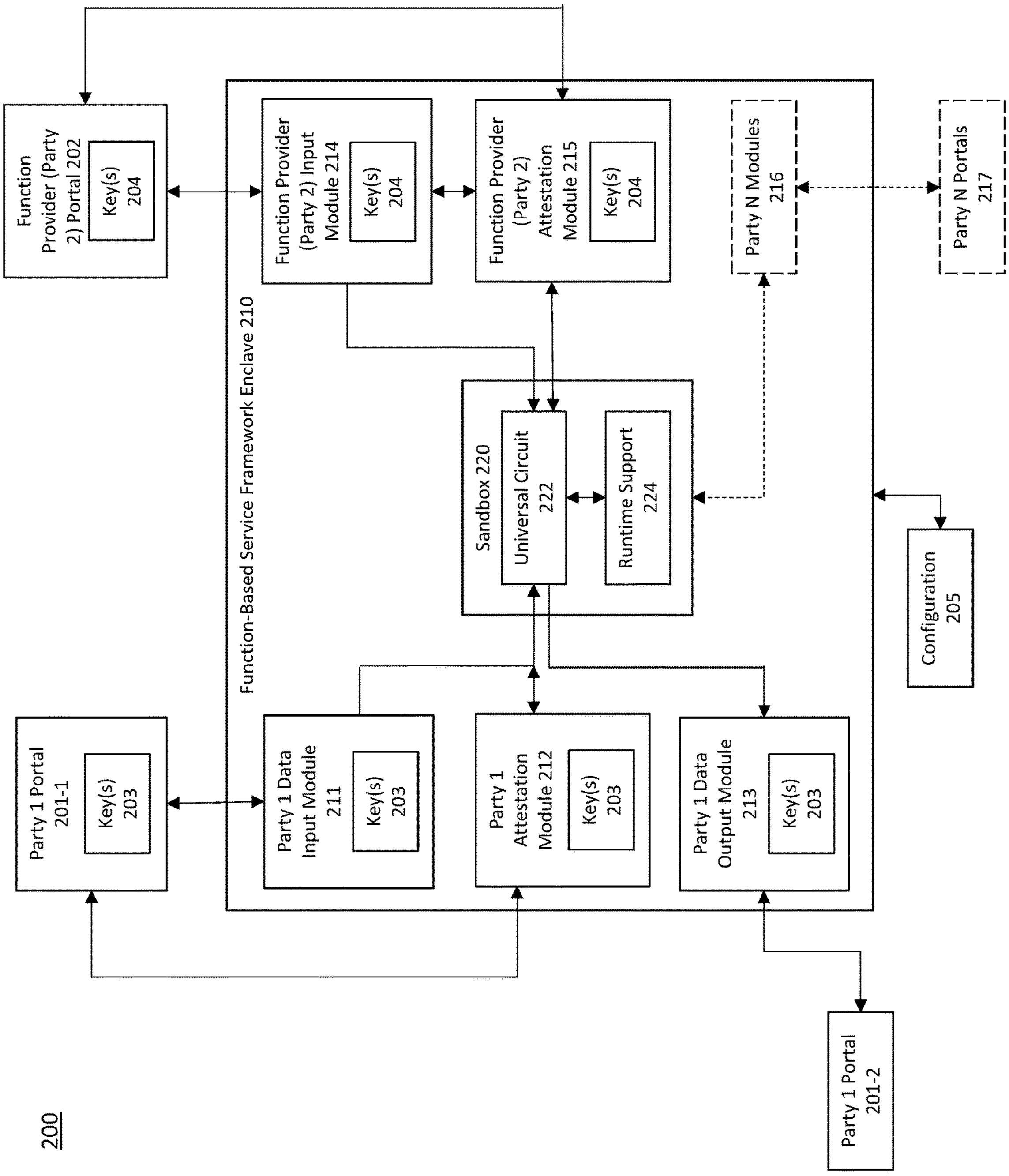
FIG. 2 illustrates integration of a trusted execution platform with a secure function-based service framework according to an illustrative embodiment.

FIG. 2 illustrates an architecture 200 for the integration of a trusted execution platform with a secure function-based service framework according to an illustrative embodiment. The architecture 200 comprises a function-based service framework enclave 210. The architecture 200 assumes that there is one party providing data and receiving an output ("Party 1") and another party providing a function ("function provider" or "Party 2"). In illustrative embodiments, the function provider can be, for example, an independent software vendor (ISV) or other function provider that may provide one or more functions via, for example, an FaaS environment. Additionally, the embodiments are not necessarily limited to one party providing data, one party receiving an output and/or one party providing a function. For example, there may be more than one party providing data, receiving an output and/or providing a function. Modules 216 and portals 217 for possible additional parties ("party N") and connections thereto are shown in dotted lines. As used herein, the terms "party" or "parties," and similarly, the terms "client(s)," "customer(s)," "vendor(s)" or "user(s)" are intended to be broadly construed so as to encompass numerous arrangements of human, hardware, software or firmware entities, as well as combinations of such entities. In some situations, parties or a party may include client(s), customer(s), vendor(s) or user(s) and vice versa.

The architecture 200 further comprises portals for each party. For example, the architecture 200 includes Party 1 portals 201-1 and 201-2 (collectively "Party 1 portals 201") and a function provider (Party 2) portal 202. The Party 1 and function provider portals 201 and 202, which may be accessible via one or more uniform resource locators (URLs) (e.g., www.p1.com and www.isv.com), as well as client, customer, vendor or user devices, can comprise, for example, Internet of Things (IoT) devices, desktop, laptop or tablet computers, mobile telephones, or other types of processing devices capable of communicating with the function-based service framework enclave 210 over a telecommunications network as described further herein in connection with FIG. 4 and elsewhere. Such devices are examples of what are more generally referred to herein as "processing devices." Some of these processing devices are also generally referred to herein as "computers." The Party 1 and function provider portals 201 and 202 and/or client, customer, vendor or user devices may also or alternately comprise virtualized computing resources, such as virtual machines (VMs), containers, etc. The Party 1 and function provider portals 201 and 202 and/or client, customer, vendor or user devices in some embodiments comprise respective computers associated with a particular company, organization or other enterprise. Although two Party 1 portals 201 and one function provider portal 202 are shown, the embodiments are not necessarily limited thereto, and more or less Party 1 and function provider portals 201 and 202 may be part of the architecture 200.

Referring to FIG. 2, configuration information 205 comprising, for example, settings and identifying information for configuring the function-based service framework enclave 210 may be transmitted from one or more applications, which may be referred to herein as an "untrusted part." The function-based service framework enclave 210 may be referred to herein as a "trusted part." In accordance with illustrative embodiments, the functions that comprise a given application program can be split into trusted and untrusted parts. One or more embodiments distinguish functions of an application into the trusted part (e.g., security-sensitive data/logic) and an untrusted part (e.g., security insensitive data/logic).

Configuration information 205 may be provided by, for example, a customer or other user. The customer or other user may be, for example, an entity such as a service provider, distinct from the Party 1 and function provider. Alternatively, the customer may be one of Party 1 and the function provider or affiliated with the Party 1 and/or the function provider. As can be seen in FIG. 2, the function-based service framework enclave 210 is created with a sandbox 220 (e.g., toolkit) comprising a universal circuit 222 and a runtime support environment 224 for the execution of the universal circuit 222. In some embodiments, the runtime support environment 224 is generated by porting code from an open source project. For example, SCONE is an open source solution that may be used to provide a secure container based on SGX, which implements supports to run different Docker applications in C, JavaScript, Python, etc. computing environments.

In illustrative embodiments, the function-based service framework enclave 210 is generated based on an application configuration, which is, for example, provided in the configuration information 205. The configuration information 205 specifies, for example, (i) the number and identity of the parties (e.g., data providing party and function providing party) for the architecture; (ii) the environment in which the enclave (e.g., function-based service framework enclave 210) will execute (e.g., C, JavaScript, Python, etc.); (iii) an identification of a location from where each party will attest the enclave (e.g., URL or other unique identifying information); (iv) an identification of the party or parties providing input data and input function(s) to the enclave (e.g., to the universal circuit 222); and (v) an identification of the party or parties receiving output data from the enclave (e.g., as a result of application of the function by the universal circuit 222). In some embodiments, the environment in which the enclave will execute depends, at least in part, on the programming language in which the universal circuit 222 is compiled.

In the non-limiting operational example comprising the architecture 200, the configuration information 205 specifies: (i) inclusion of Party 1 (data provider) and the function provider (Party 2); (ii) a C language environment; (iii) that Party 1 and the function provider will attest the function-based service framework enclave 210 from Party 1 portal 201-1 (www.p1.com) and function provider portal 202 (www.isv.com); (iv) that Party 1 will send input data to the function-based service framework enclave 210 from Party 1 portal 201-1 (www.p1.com) and the function provider will send one more functions to be executed by the universal circuit 222 to the function-based service framework enclave 210 from function provider portal 202 (www.isv.com); and (v) that Party 1 will receive output data from the function-based service framework enclave 210 at Party 1 portal 201-2 (e.g., www.p1-output.com), while the function provider will not receive any output from the function-based service framework enclave 210. As can be understood, the input source can be different from the output destination for a given party. Alternatively, the input source and the output destination for a given party can be the same (e.g., both input source and output destination for Party 1 can be www.p1.com). In the example architecture 200, the function provider is exclusively a provider of one or more functions (e.g., proprietary functions) to be executed on the input data from other parties (e.g., Party 1), and does not receive output from the function-based service framework enclave 210. The embodiments are not necessarily limited to the configurations of the architecture 200. For example, in other scenarios, there may be more parties providing data and/or functions (e.g., as designated by party N in FIG. 2), multiple parties that provide data inputs may also receive an output, some parties may not necessarily provide an input but receive an output, etc.

Based on the configuration information 205, the generated function-based service framework enclave 210 comprises a Party 1 data input module 211, a Party 1 attestation module 212, a Party 1 data output module 213, a function provider (Party 2) input module 214 and a function provider (Party 2) attestation module 215. As noted herein above, party N modules 216 (e.g., input and/or output modules) and party N portals 217 are shown with broken lines for illustrative purposes to indicate that modules 216 and portals 217 for additional parties would be generated and specified if the configuration information 205 identified additional parties and whether the additional parties would be providing functions or data and/or receiving an output.

In illustrative embodiments, each party (e.g., Party 1 and the function provider (Party 2)) remotely attests the function-based service framework enclave 210. For example, the hardware/environment (e.g., C language environment) signature is provided to the Party 1 and function provider attestation modules 212 and 215. Party 1 and the function provider remotely attest the hardware/environment and that the function-based service framework enclave 210 is secure from Party 1 portal 201-1 (www.p1.com) and function provider portal 202 (www.isv.com). Attestation operations are not performed in the sandbox 220, and are performed using the Party 1 and function provider attestation modules 212 and 215 to process remote attestations of the function-based service framework enclave 210 from Party 1 and the function provider.

Following attestation by the parties (e.g., Party 1 and function provider), the parties provide input/output encryption/decryption keys to the function-based service framework enclave 210. For example, Party 1 provides one or more keys 203 corresponding to Party 1 to the Party 1 data input module 211, Party 1 attestation module 212 and Party 1 data output module 213. The keys 203 can be provided via, for example, the Party 1 portals 201. The function provider provides one or more keys 204 corresponding to function provider to the function provider input module 214 and function provider attestation module 215. The keys 204 can be provided via, for example, the function provider portal 202. Keys corresponding to a first party (e.g., keys 203) are invisible to a second party (e.g., function provider), and vice versa (e.g., keys 204 are invisible to Party 1). In other words, each party has no knowledge of another party's keys. In addition, the keys from different parties are visible to the enclave (e.g., function-based service framework enclave 210), but are not visible to external platform owners (for example, the cloud service providers) that may be providing services to the parties.

The keys 203 are stored in the modules 211, 212 and 213, and the keys 204 are stored in the modules 214 and 215. The storage of the keys 203 and 204 can be verified by the different parties (e.g., Party 1 and the function provider) via remote attestation. According to one or more embodiments, the keys for each party are symmetric (e.g., the same for encryption and decryption). Alternatively, the encryption and decryption keys for each party are different. The keys for input and output data can be the same or different for a given party, depending on the application. For example, if output data is written into a database different from a database where the input data originates, different keys are used for accessing the different databases.

Using the different keys provided by the different parties (e.g., keys 203 and 204), the function-based service framework enclave 210 establishes secure communication channels between all input sources and input modules and all output recipients and output modules. For example, using input keys of the keys 203, a secure communication channel is established between Party 1 portal 201-1 and Party 1 data input module 211. Similarly, using input keys of the keys 204, a secure communication channel is established between the function provider portal 202 and function provider input module 214. Using output keys of the keys 203, a secure communication channel is established between Party 1 portal 201-2 and Party 1 data output module 213. One or more of the keys 203 are used to establish secure connections between the Party 1 portal 201-1 and Party 1 attestation module 212, and one or more of the keys 204 are used to establish secure connections between the function provider portal 202 and function provider attestation module 215. The secure connections utilize, for example, SSL (Secure Socket Layer) and/or TLS (Transport Layer Security) protocols.

As explained in more detain herein below, the input and output modules (e.g., input modules 211 and 214, and Party 1 data output module 213) perform input-output (IO) operations so that the components in the sandbox 220 (e.g., universal circuit 222 and runtime support environment 224) do not perform IO operations. Following receipt of input data from the Party 1 portal 201-1 over a secure channel, the Party 1 data input module 211 uses a decryption key of the keys 203 to decrypt the input data, which was encrypted at the Party 1 portal 201-1 using an encryption key of the keys 203. Following receipt of a function from the function provider portal 202 over a secure channel, the function provider input module 214 uses a decryption key of the keys 204 to decrypt the input function, which was encrypted at the function provider portal 202 using an encryption key of the keys 204. After decryption, the decrypted input data from Party 1 and the decrypted function from the function provider are transmitted to the universal circuit 222 from the Party 1 and function provider input modules 211 and 214.

In illustrative embodiments, following remote attestation, a proprietary function (e.g., an intellectual property protected function) is provided to the function-based service framework enclave 210 over a secure channel from the function provider portal 202 to the function provider input module 214. As a result, functions from function providers can be dynamically loaded to the function-based service framework enclave 210 and protected from access by parties other than the function provider. As can be understood, the function is not fed in with the configuration information 205 from an untrusted part. The function provider input and attestation modules 214 and 215, as well as the universal circuit 222 inside the sandbox 220, provide a framework for PFE of a proprietary function.

Independent of the function, the configuration information 205 can include specifications of the universal circuit 222. The specifications may indicate, for example, the programming environment of the universal circuit 222 (e.g., C language environment) and the configuration of the universal circuit 222 so that the universal circuit 222 can be initialized and ready for loading of a received function. As noted herein, in illustrative embodiments, the universal circuit 222 comprises a circuit that can be programmed to simulate any Boolean function $f(x)$ up to a given size. For example, in programming the universal circuit 222 to compute the function $f(x)$, in addition to an input x (from, for example, Party 1), the universal circuit 222 takes as input program or control bits $p_c$ (e.g., from the function provider via function provider input module 214) that encode the universal circuit 222 to produce an output $UC(x, p_c)=f(x)$. The universal circuit 222 carries out the computations specified by the instructions of a given function provided via the respective control bits. The instructions include any algorithms performed on the data (e.g., determining relationships between the data (e.g., graph algorithm to determine if two graphs are homomorphic)), or performing some other operation such as, but not necessarily limited to, determining ranking, trends, averages, percentages or other conclusions from the data. The universal circuit 222 performs a defined computation based on input data from parties (e.g., Party 1), while the function-based service framework enclave 210 keeps the function private to the function provider, and the input(s) from a given party private to the given party.

The universal circuit 222 is executed in the sandbox 220, such that IO operations are not performed in the sandbox 220. In other words, IO operations are not performed by the universal circuit 222 or by the runtime support environment 224. The runtime support environment 224 provides a limited support library that is accessible by the universal circuit 222. The runtime support environment 224 provides support for data processing, but not for performance of IO operations. The IO operations (e.g., receipt of the input data from a party (e.g., from Party 1) and receipt of a function from the function provider (e.g., party 2) needed by the universal circuit 222 and transmission of output data to a party (e.g., Party 1) from the universal circuit 222) are performed by the input and output modules (e.g., Party 1 data input module 211, Party 1 data output module 213 and function provider input module 214). For example, the Party 1 data input module 211 receives input data from the Party 1 portal 201-1, the function provider input module 214 receives a function from the function provider portal 202, and the Party 1 data output module 213 sends the output data to the Party 1 portal 201-2. The universal circuit 222 is dedicated to data processing, and does not perform IO operations.

According to one or more embodiments, every operation executed inside the function-based service framework enclave 210, including operations performed in the sandbox 220 require an operation call stack to track active subroutines. By monitoring the call stacks, the function-based service framework enclave 210 will know if any IO operations have been performed by the universal circuit 222. If the function-based service framework enclave 210 determines that IO operations have been performed by the universal circuit 222, the function-based service framework enclave 210 will take remedial action (e.g., modify universal circuit and/or runtime support code) to prevent such IO operations.

After the application of the function to the input data (e.g., computation) by the universal circuit 222, the output from the universal circuit 222 is sent to a callee function in the function-based service framework enclave 210, and the Party 1 data output module 213 encrypts the output using an encryption key of the keys 203, and sends the encrypted output to the Party 1 portal 201-2 over a secure channel, as specified by the configuration information 205. An output of the universal circuit 222 is not sent to the function provider. The universal circuit 222 computes the output without knowing sources of the respective data inputs and recipients of the output.

Advantageously, by incorporating features of a TEE implementation, the security of the function-based service framework enclave 210 is ensured. For example, with remote attestation, all parties can ensure that the function-based service framework enclave 210 is secure and is not tampered with by third parties. In addition, the TEE implementation provides assurance that the function from the function provider has not been tampered with by any parties. Furthermore, with the TEE implementation all communications between the function-based service framework enclave 210 and input data and function sources and output data recipients are secure due to the secure communication channels, which use, for example, SSL and/or TLS protocols.

Figure 3A:
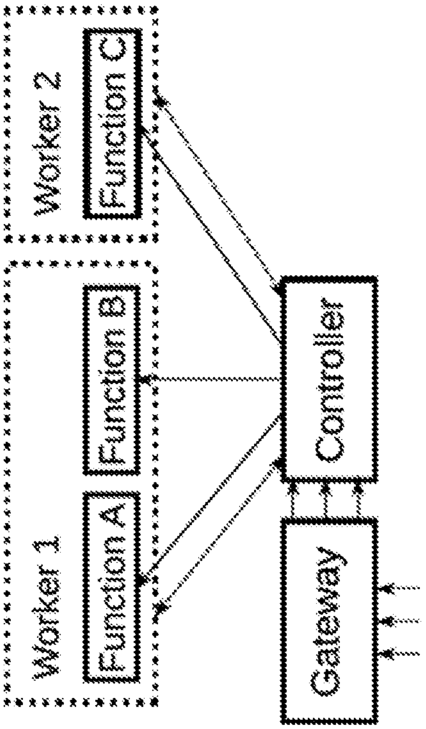
FIGS. 3A and 3B illustrate an architecture of a function-based service framework with which one or more illustrative embodiments can be implemented.
Figure 3B:
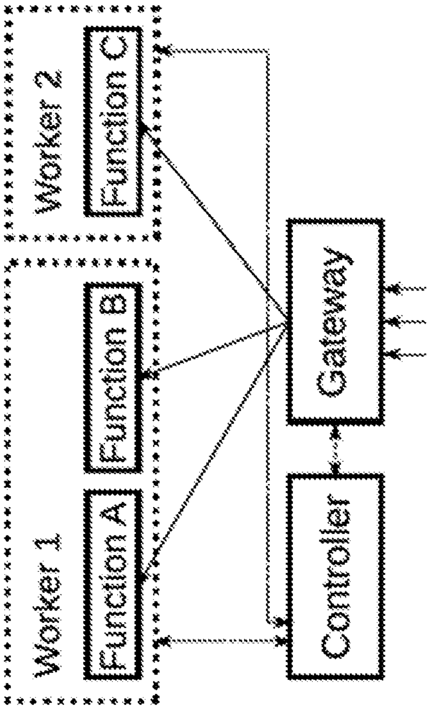

It is realized that current FaaS infrastructures may leak sensitive information of clients. FIGS. 3A and 3B respectively show two different typical structures 300 and 310 of current FaaS infrastructures, which use a gateway to terminal client requests from a public network and a controller as a task scheduler (controller as shown) to schedule the invocation of a function inside the internal network in FIG. 3A, or vice versa in FIG. 3B. In both cases, the function body, the input, and the output from the client are stored/forwarded between the controller and the worker in cleartext in the message queue in the FaaS infrastructure, which may be eavesdropped on by an insider attacker from the service provider and result in sensitive information leakage.

In an effort to address the technical problems associated with current infrastructures, in accordance with illustrative embodiments, for data provider parties, the function is prevented from being used to access input and output data being provided from and sent to the data provider parties. In more detail, as there is no output for the function provider, once received by the function-based service framework enclave 210 and loaded to the universal circuit 222, there is no communication from the function to the function provider outside the function-based service framework enclave 210. As a result, there is no unauthorized data leakage from the function to unauthorized parties. For the function providers, the function-based service framework enclave 210 prevents data providers and Internet service providers (ISPs) from accessing a function provided to the function-based service framework enclave 210. For example, the function is provided to the function-based service framework enclave 210 over secure channels established by the function-based service framework enclave 210 using one or more encryption/decryption keys. The universal circuit 222 is implemented after attestation by the function provider, and the encryption/decryption keys 204 used by the function provider are only known to the function provider and the function-based service framework enclave 210, and are not known by the data provider party (e.g., Party 1) or by the ISP. In illustrative embodiments, such security features are executed at least in part by an SGX implementation.

As a further advantage, with the provision of the input modules 211 and 214, Party 1 data output module 213, and the sandbox 220 including the universal circuit 222 and runtime support environment 224, the function-based service framework enclave 210 decouples IO operations and computations by the universal circuit 222. The function-based service framework enclave 210 delegates IO operations from different sources and to different recipients to input and output modules dedicated to respective parties in accordance with customer specifications, and never exchanges data or functions between the respective parties. As a result, all parties can be assured that their data and functions are not shared with other parties. Moreover, as noted herein above, the universal circuit 222 executes function algorithms without knowing from where the input is received and to where the output will be sent. With IO operation restrictions enforced by the function-based service framework enclave 210, the universal circuit 222 has no capability to exchange data or functions with components outside of the function-based service framework enclave 210. As a result, the universal circuit 222 does not execute IO operations with the parties (e.g., Party 1 and the function provider (Party 2)).

As noted above, data and functions are decrypted prior to being sent to the universal circuit 222. In one or embodiments, the universal circuit 222 may be executed, at least in part, with cleartext code, which is text that has not been encrypted and does not require decryption to be displayed. For example, cleartext is rendered according to American Standard Code for Information Interchange (ASCII) encoding, which can be read by a word processor or text editor. In one or more embodiments, the universal circuit 222 is implemented with previously decrypted data (e.g., decrypted prior to being sent to the universal circuit 222). Accordingly, the embodiments eliminate the overhead from encryption and decryption that is present with conventional approaches using homomorphic encryption.

In illustrative embodiments, the universal circuit 222 runs in a CPU, which eliminates extra protocols for data exchange between different parties that are associated with secret sharing circuit protocol. As a result, by eliminating the noted technical problems associated with homomorphic encryption and secret sharing circuits, the techniques of the embodiments can be used across WANs, and therefore in cloud and/or edge computing environments.

Figure 4:
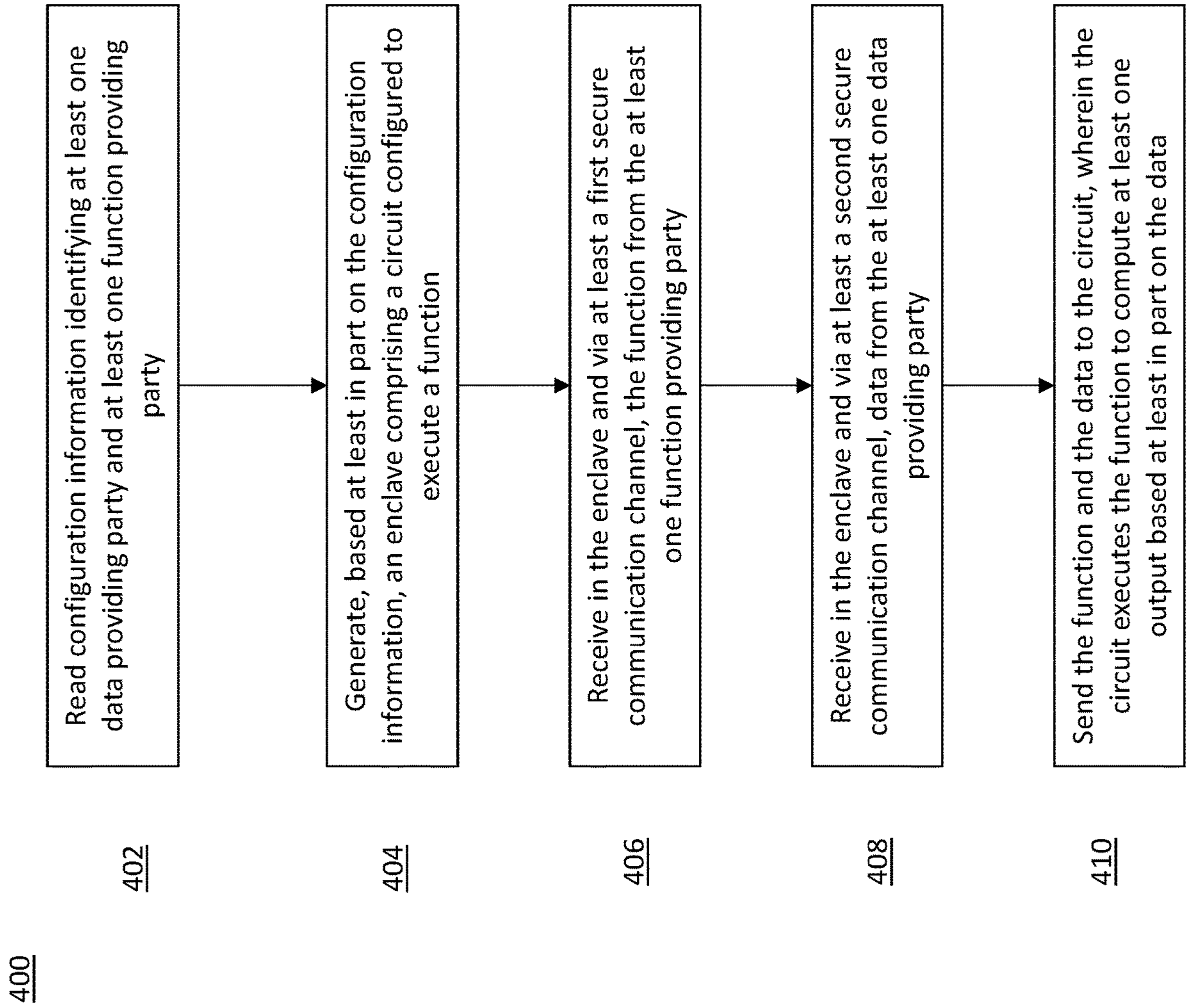
FIG. 4 illustrates a methodology for implementing operations in a secure function-based service framework according to an illustrative embodiment.

FIG. 4 illustrates a methodology 400 for implementing operations in a secure function-based service framework according to an illustrative embodiment. With reference to FIG. 3, the methodology 400 includes steps 402 through 410, and is suitable for use in the architecture 200 but is more generally applicable to other types of architectures configured for integrating a trusted execution platform with a secure function-based service framework.

In step 402, configuration information identifying at least one data providing party (e.g., Party 1) and at least one function providing party (e.g., function provider (Party 2)) is read. The configuration information further identifies respective locations from where the at least one function providing party and the at least one data providing party will attest the enclave.

In step 404, based at least in part on the configuration information, an enclave (e.g., the function-based service framework enclave 210) comprising a circuit configured to execute a function is generated. The circuit comprises, for example, a universal circuit (e.g., universal circuit 222). In an illustrative embodiment, the configuration information identifies a computing environment in which the circuit will operate.

In step 406, the function is received in the enclave from the at least one function providing party. The function is received via at least a first secure communication channel. In step 408, data is received in the enclave from the at least one data providing party. The data is received via at least a second secure communication channel.

In step 410, the function and the data are sent to the circuit. In one or more embodiments, the data from the at least one data providing party is decrypted prior to sending the data to the circuit, and the function from the at least one function providing party is decrypted prior to sending the function to the circuit.

The circuit executes the function to compute at least one output based at least in part on the data. The at least one output is sent over at least the second secure communication channel to the at least one data providing party. The at least one output is encrypted prior to sending the at least one output to the at least one data providing party.

In the method, one or more keys (e.g., keys 204) are received from the at least one function providing party, and one or more keys (e.g., keys 203) are received from the at least one data providing party. The one or more keys are used in connection with establishing at least the first communication channel between the at least one function providing party and the enclave, and at least the second secure communication channel between the at least one data providing party and the enclave. The one or more keys of the at least one function providing party are invisible to the at least one data providing party, and the one or more keys of the at least one data providing party are invisible to the at least one function providing party.

According to illustrative embodiments, the first and second secure communication channels are established in response to the at least one function providing party and the at least one data providing party remotely attesting the enclave.

At least one input component (e.g., Party 1 data input module 211) is generated in the enclave to receive the data from the at least one data providing party, and at least one output component (e.g., Party 1 data output module 213) is generated in the enclave to send the at least one output over at least the second secure communication channel to the at least one data providing party. At least one other input component (e.g., function provider input module 214) is generated in the enclave to receive the function from the at least one function providing party. In illustrative embodiments, the circuit is restricted from performing IO operations, wherein the at least one input component, the at least one other input component and the at least one output component perform the IO operations.

At least one attestation component corresponding to the at least one data providing party (e.g., Party 1 attestation module 212) and at least one other attestation component corresponding to the at least one function providing party (e.g., function provider attestation module 215) are generated to process remote attestations of the enclave from the at least one data providing party and the at least one function providing party.

The particular processing operations and other system functionality described in conjunction with the flow diagram of FIG. 4 are presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 4 can be implemented at least in part in the form of one or more software programs stored in memory and executed by a processor of a processing device such as a computer or server.

Advantageously, as explained herein in detail, illustrative embodiments provide an effective PFE implementation based on TEE for a secure function-based service framework that protects provided party data and proprietary functions. The embodiments provide a technical solution that implements a universal circuit in a private function execution container (e.g., sandbox 220). The universal circuit can be dynamically configured to be adapted to a specific function which will be executed.

The universal circuit container is implemented inside a secure function-based service framework enclave. As a result, the function provider (e.g., ISV) may be a party of the function-based service framework enclave without receiving an output (e.g., an output of the application of the function or an output comprising any sensitive data from data providing parties). As an additional advantage, the universal circuit may be compiled into a standard program (e.g., C program), which can be used to execute any function. Further, since the function-based service framework is implemented inside a TEE, data and functions of participating parties are protected from access by outside entities, such that FaaS can be securely provided.

Illustrative embodiments also advantageously avoid the overhead from encryption and decryption that is associated with homomorphic encryption, and avoid the extra protocols for data exchange that are used with secret sharing circuits. As an additional advantage, the framework of the embodiments is adaptable to multiple types of applications (e.g., database accessing applications, out-source computing applications, etc.) and to multiple types of computing environments (C, Java, Python, Javascript, etc.) by integrating different types of runtime support into the enclave. Moreover, the building of the framework can be completely automated and hence is easy to use for customers with limited expertise. For example, a customer need only to define the configuration settings via one or more user interfaces, and the framework will automatically generate the enclave including input, output and attestation modules and a sandbox comprising the universal circuit.

Figure 5:
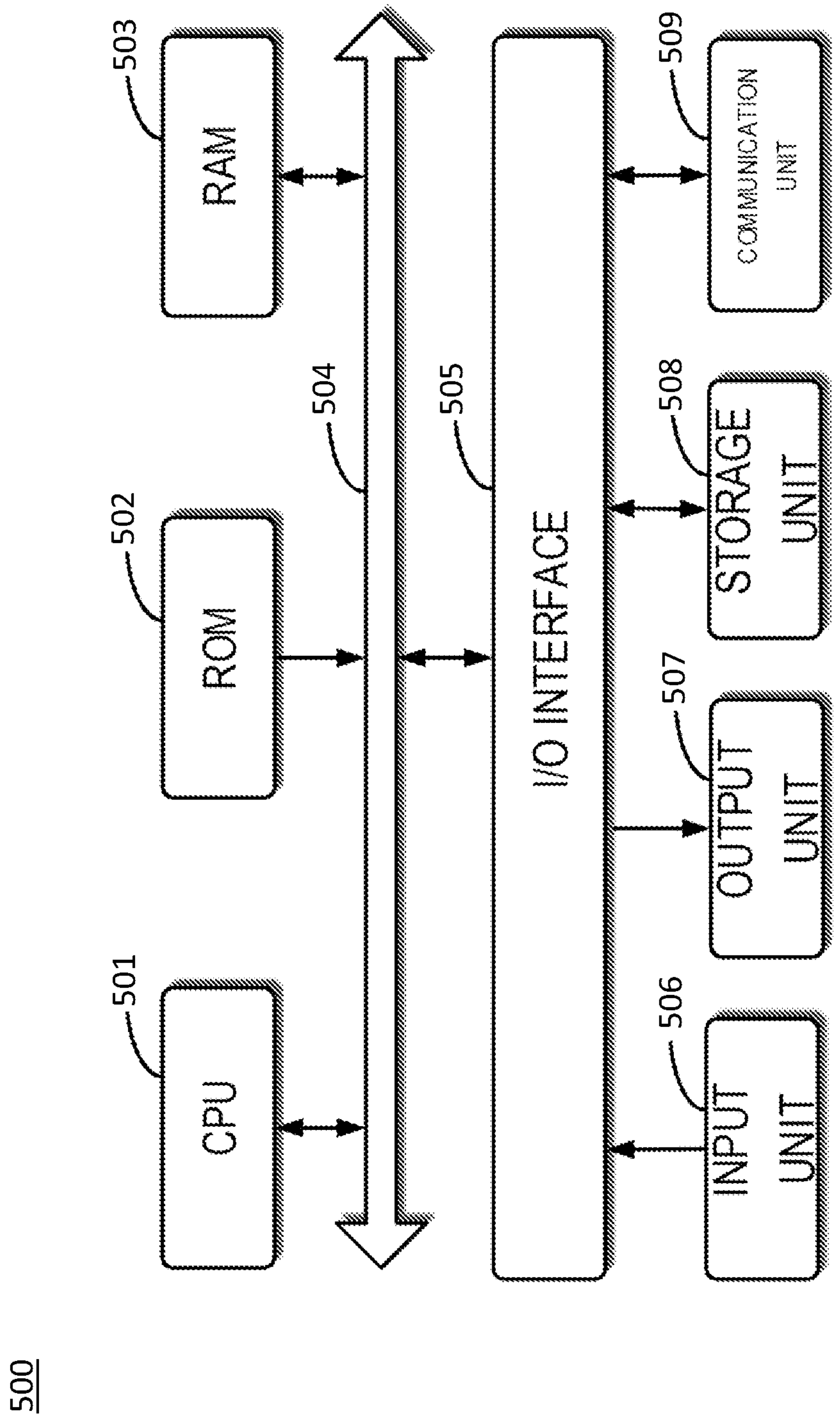
FIG. 5 illustrates a processing platform used to implement an information processing system with execution environment functionalities according to an illustrative embodiment.

FIG. 5 illustrates a block diagram of an example processing device or, more generally, an information processing system 500 that can be used to implement illustrative embodiments. For example, one or more components in FIGS. 1-4 can comprise a processing configuration such as that shown in FIG. 5 to perform steps described herein. Note that while the components of system 500 are shown in FIG. 5 as being singular components operatively coupled in a local manner, it is to be appreciated that in alternative embodiments each component shown (CPU, ROM, RAM, and so on) can be implemented in a distributed computing infrastructure where some or all components are remotely distributed from one another and executed on separate processing devices. In further alternative embodiments, system 500 can include multiple processing devices, each of which comprise the components shown in FIG. 5.

As shown, the system 500 includes a central processing unit (CPU) 501 which performs various appropriate acts and processing, based on a computer program instruction stored in a read-only memory (ROM) 502 or a computer program instruction loaded from a storage unit 508 to a random access memory (RAM) 503. The RAM 503 stores therein various programs and data required for operations of the system 500. The CPU 501, the ROM 502 and the RAM 503 are connected via a bus 504 with one another. An input/output (I/O) interface 505 is also connected to the bus 504. It is to be appreciated that component 501 in FIG. 5 can alternatively or additionally represent an accelerator such as, but not limited to, a Tensor Processing Unit (TPU), a graphics processing unit (GPU), and combinations thereof.

The following components in the system 500 are connected to the I/O interface 505, comprising: an input unit 506 such as a keyboard, a mouse and the like; an output unit 507 including various kinds of displays and a loudspeaker, etc.; a storage unit 508 including a magnetic disk, an optical disk, and etc.; a communication unit 509 including a network card, a modem, and a wireless communication transceiver, etc. The communication unit 509 allows the system 500 to exchange information/data with other devices through a computer network such as the Internet and/or various kinds of telecommunications networks.

Various processes and processing described above may be executed by the CPU 501. For example, in some embodiments, methodologies described herein may be implemented as a computer software program that is tangibly included in a machine readable medium, e.g., the storage unit 508. In some embodiments, part or all of the computer programs may be loaded and/or mounted onto the system 500 via ROM 502 and/or communication unit 509. When the computer program is loaded to the RAM 503 and executed by the CPU 501, one or more steps of the methodologies as described above may be executed.

Illustrative embodiments may be a method, a device, a system, and/or a computer program product. The computer program product may include a computer readable storage medium having computer readable program instructions thereon for causing a processor to carry out aspects of illustrative embodiments.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of illustrative embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Various technical aspects are described herein with reference to flowchart illustrations and/or block diagrams of methods, device (systems), and computer program products according to illustrative embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other devices to produce a computer implemented process, such that the instructions which are executed on the computer, other programmable devices, or other devices implement the functions/acts specified in the flowchart and/or block diagram block or blocks.

The flowchart and block diagrams illustrate architecture, functionality, and operation of possible implementations of systems, methods and computer program products according to various embodiments. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

reading configuration information identifying one or more data providing parties and at least one function providing party;

generating, based at least in part on the configuration information, an enclave comprising one or more data attestation components corresponding to each of the one or more data providing parties, one or more data input components corresponding to each of the one or more data providing parties, at least one function attestation component corresponding to the at least one function providing party, at least one function input component corresponding to the at least one function providing party, and a secure component comprising at least a circuit configured to execute a function;

establishing a first secure communication channel between the at least one function providing party and the at least one function input component in response to an affirmative attestation at the at least one function attestation component of the enclave;

establishing one or more second secure communication channels between each of the one or more data input components and the corresponding data providing parties in response to an affirmative attestation at the respective one or more data attestation components of the enclave;

receiving, via the first secure communication channel, the function from the at least one function providing party such that the at least one function is private relative to the one or more data providing parties;

receiving, via the one or more second secure communication channels, data from the one or more data providing parties;

sending, by the at least one function input component corresponding to the at least one function providing party, the function to the circuit of the secure component of the enclave, and sending, by the one or more data input components corresponding to each of the one or more data providing parties, the data to the circuit of the secure component of the enclave, wherein the circuit executes the function to compute at least one output based at least in part on the data;

sending, by at least one output component of the enclave, the at least one output to the one or more data providing parties; and implementing an operation call stack within the enclave to track operations performed inside the enclave including operations performed within the secure component to determine if an input-output operation is performed by the circuit of the secure component, and perform a remedial operation to prevent the circuit from performing input-output operations;

wherein the configuration information identifies respective locations from where the at least one function providing party and the one or more data providing parties will attest the enclave; and wherein the method is performed by at least one processor coupled to at least one memory.

2. The method of claim 1, wherein the circuit comprises a universal circuit.

3. The method of claim 1, further comprising:

receiving one or more keys from the at least one function providing party; and using the one or more keys in connection with establishing at least the first secure communication channel between the at least one function providing party and the one or more data input components of the enclave;

wherein the one or more keys are invisible to the one or more data providing parties.

4. The method of claim 1, further comprising:

receiving one or more keys from the one or more data providing parties; and using the one or more keys in connection with establishing the one or more second secure communication channels between the one or more data providing parties and the at least one output component of the enclave;

wherein the one or more keys are invisible to the at least one function providing party.

5. The method of claim 1, further comprising sending the at least one output over the one or more second secure communication channels to the one or more data providing parties.

6. The method of claim 5, further comprising encrypting the at least one output prior to sending the at least one output to the one or more data providing parties.

7. The method of claim 1, further comprising decrypting the data from the one or more data providing parties prior to sending the data to the circuit.

8. The method of claim 1, further comprising decrypting the function from the at least one function providing party prior to sending the function to the circuit.

9. The method of claim 1, wherein the first secure communication channel and the one or more second secure communication channels are established in response to the at least one function providing party and the one or more data providing parties remotely attesting the enclave.

10. The method of claim 1, wherein the configuration information identifies a computing environment in which the circuit will operate.

11. The method of claim 1, further comprising:

generating the one or more data input components in the enclave to receive the data from the one or more data providing parties based on the configuration information identifying the one or more data providing parties; and generating the at least one output component in the enclave to send the at least one output over the one or more second secure communication channels to the one or more data providing parties based on the configuration information identifying the one or more data providing parties as a recipient of the at least one output.

12. The method of claim 11, further comprising generating the at least one function input component in the enclave to receive the function from the at least one function providing party based on the configuration information identifying the at least one function providing party.

13. The method of claim 12, wherein the one or more data input components, the at least one function input component and the at least one output component perform input-output operations of the enclave.

14. The method of claim 1, at least one attestation component corresponding to the one or more data providing parties and the at least one function attestation component corresponding to the at least one function providing party process remote attestations of the enclave from the one or more data providing parties and the at least one function providing party.

15. A system, comprising:

at least one processor and at least one memory, the at least one processor being configured to:

read configuration information identifying one or more data providing parties and at least one function providing party;

generate, based at least in part on the configuration information, an enclave comprising at one or more data attestation components corresponding to each of the one or more data providing parties, one or more data input components corresponding to each of the one or more data providing parties, at least one function attestation component corresponding to the at least one function providing party, at least one function input component corresponding to the at least one function providing party, and a secure component comprising at least a circuit configured to execute a function;

establish a first secure communication channel between the at least one function providing party and the at least one function input component in response to an affirmative attestation at the at least one function attestation component of the enclave;

establish one or more second secure communication channels between each of the one or more data input components and the corresponding data providing parties in response to an affirmative attestation at the respective one or more data attestation components of the enclave;

receive, via the first secure communication channel, the function from the at least one function providing party such that the at least one function is private relative to the one or more data providing parties;

receive, via the one or more second secure communication channels, data from the one or more data providing parties;

send, by the at least one function input component corresponding to the at least one function providing party, the function to the circuit of the secure component of the enclave, and send, by the one or more data input components corresponding to each of the one or more data providing parties, the data to the circuit of the secure component of the enclave, wherein the circuit executes the function to compute at least one output based at least in part on the data;

send, by at least one output component of the enclave, the at least one output to the one or more data providing parties; and implement an operation call stack within the enclave to track operations performed inside the enclave including operations performed within the secure component to determine if an input-output operation is performed by the circuit of the secure component, and perform a remedial operation to prevent the circuit from performing input-output operations;

wherein the configuration information identifies respective locations from where the at least one function providing party and the one or more data providing parties will attest the enclave.

16. The system of claim 15, wherein the at least one processor is further configured to:

generate the one or more data input components in the enclave to receive the data from the one or more data providing parties based on the configuration information identifying the one or more data providing parties; and generate the at least one output component in the enclave to send the at least one output over the one or more second secure communication channels to the one or more data providing parties based on the configuration information identifying the one or more data providing parties as a recipient of the at least one output.

17. The system of claim 16, wherein the at least one processor is further configured to generate the at least one function input component in the enclave to receive the function from the at least one function providing party based on the configuration information identifying the at least one function providing party.

18. A computer program product stored on a non-transitory computer-readable medium and comprising machine executable instructions, the machine executable instructions, when executed, causing a processing device to:

read configuration information identifying one or more data providing parties and at least one function providing party;

generate, based at least in part on the configuration information, an enclave comprising one or more data attestation components corresponding to each of the one or more data providing parties, one or more data input components corresponding to each of the one or more data providing parties, at least one function attestation component corresponding to the at least one function providing party, at least one function input component corresponding to the at least one function providing party, and a secure component comprising at least a circuit configured to execute a function;

establish a first secure communication channel between the at least one function providing party and the at least one function input component in response to an affirmative attestation at the at least one function attestation component of the enclave;

establish one or more second secure communication channels between each of the one or more data input components and the corresponding data providing parties in response to an affirmative attestation at the respective one or more data attestation components of the enclave;

receive, via the first secure communication channel, the function from the at least one function providing party such that the at least one function is private relative to the one or more data providing parties;

receive, via the one or more second secure communication channels, data from the one or more data providing parties;

send, by the at least one function input component corresponding to the at least one function providing party, the function to the circuit of the secure component of the enclave, and send, by the one or more data input components corresponding to each of the one or more data providing parties, the data to the circuit of the secure component of the enclave, wherein the circuit executes the function to compute at least one output based at least in part on the data;

send, by at least one output component of the enclave, the at least one output to the one or more data providing parties; and implement an operation call stack within the enclave to track operations performed inside the enclave including operations performed within the secure component to determine if an input-output operation is performed by the circuit of the secure component, and perform a remedial operation to prevent the circuit from performing input-output operations;

wherein the configuration information identifies respective locations from where the at least one function providing party and the one or more data providing parties will attest the enclave.

19. The computer program product of claim 18, wherein the machine executable instructions further cause the processing device to:

generate the one or more data input components in the enclave to receive the data from the one or more data providing parties based on the configuration information identifying the one or more data providing parties; and generate the at least one output component in the enclave to send the at least one output over the one or more second secure communication channels to the one or more data providing parties based on the configuration information identifying the one or more data providing parties as a recipient of the at least one output.

20. The computer program product of claim 19, wherein the machine executable instructions further cause the processing device to generate the at least one function input component in the enclave to receive the function from the at least one function providing party based on the configuration information identifying the at least one function providing party.

* * * * *